US012777205B2

(12) United States Patent
Hamilton et al.

(10) Patent No.: US 12,777,205 B2
(45) **Date of Patent: *Oct. 27, 2026**

(54) INFERENTIAL GENERATION OF CUSTOMIZED DIGITAL DATA STREAMS

(71) Applicant: Cast Iron Media LLC, Irvington, NY (US)

(72) Inventors: Brian Hamilton, Irvington, NY (US); Vinicius Pereira Lamego, Sao Paulo (BR); Trent Staley, Irvington, NY (US); Kent Heyman, Irvington, NY (US)

(73) Assignee: Cast Iron Media LLC, White Plains, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/350,034

(22) Filed: Jul. 11, 2023

(65) Prior Publication Data

US 2024/0031620 A1 Jan. 25, 2024

Related U.S. Application Data

(60) Provisional application No. 63/391,293, filed on Jul. 21, 2022.

(51) Int. Cl.
*H04N 21/234* (2011.01)
*H04N 21/262* (2011.01)

(52) U.S. Cl.
CPC . *H04N 21/23424* (2013.01); *H04N 21/26241* (2013.01)

(58) Field of Classification Search
CPC ................................................ H04N 21/23424
See application file for complete search history.

(56) References Cited

U.S. PATENT DOCUMENTS

2002/0147984 A1* 10/2002 Tomsen ................. H04N 7/088 348/E7.071
2008/0215437 A1* 9/2008 Levy ...................... G06Q 30/02 705/14.54
2011/0314496 A1* 12/2011 Di Mattia .......... H04N 21/2362 725/36
2013/0263178 A1* 10/2013 Dow ................ H04N 21/25866 725/32
2017/0171623 A1* 6/2017 Peterson .............. H04N 21/472
2018/0270516 A1* 9/2018 Dalbec ............... H04N 21/4622
2020/0322648 A1* 10/2020 Kelly ............... H04N 21/25816

* cited by examiner

*Primary Examiner* — Joshua D Taylor
(74) *Attorney, Agent, or Firm* — David J. Powsner; Davis Malm D'Agostine PC

(57) ABSTRACT

Methods of digital content generation according to an aspect of the invention include the steps of receiving a request for a second digital content piece to supplement a first digital content piece being streamed to a user digital data device; determining a source of the first digital content piece and a locale of the user digital data device; inferring a type of the first digital content piece from the source of the first digital content piece and from a time for delivery of the first digital content piece to the user digital data device; selecting a digital content piece from among a plurality of digital content pieces, each of which is associated with one or more locales; and, transmitting, as the second digital content piece, the selected digital content piece or a reference thereto for delivery to the user digital data device in connection with the first digital content piece.

13 Claims, 6 Drawing Sheets

INFERENTIAL GENERATION OF CUSTOMIZED DIGITAL DATA STREAMS

This application claims the benefit of U.S. Patent Application Ser. No. 63/391,293, filed Jul. 21, 2022, entitled "Inferential Generation of Customized Digital Data Streams," the teachings of which are incorporated herein by reference.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The invention pertains to the generation of digital data and, more particularly, to the customization of digital data streams. The invention has application, by way of non-limiting example, in the streaming of sports events and other live and pre-recorded content for viewing nationally or regionally on mobile phones, set top boxes and other end user devices.

Customized content delivery has been an objective of content publishers and desire of content consumers since the advent of broadcast television. Viewing audiences had to satisfy themselves with changing channels and, more recently, surfing them, as a means of scratching the itch. On-demand digital content delivery brings the promise of consumer-driven content customization, though, for now, it has simply made channel surfing a multidimensional experience.

Content distributors have fared somewhat better when it comes to customization of broadcast and, more recently, streamed content. Early broadcast television, though nationally produced, was distributed on a local basis by affiliate stations who injected content into or over the national network feed before broadcasting it over towers to a local audience. In this "linear" approach, affiliates use demographic studies, surveys (e.g., Nielson ratings) and the like, to discern the broad outlines of its customer's wants and needs and to customize the national feeds accordingly.

The rise of the "set top" box and, more recently, the content delivery app has given distributers unprecedented access to viewer data. Whether through cookies, customer databases or otherwise, "digital" programming as it is called makes it possible deliver video streams that are modified to appeal to individual consumer wants and needs, leapfrogging the statistical targeting of linear programming.

Data privacy laws, however, increasingly restrict the ability of content publishers that collect viewer data, e.g., through app registrations and the like, to share it with the distributors who are charged with customizing content streams for delivery. This can be remedied through consolidation of content production and distribution; however, that has not proven a recipe for long-term industry growth.

An object of this invention is to provide improved systems and methods for the generation of digital data and, more particularly, to the customization of digital data streams.

A related object is to provide such systems and methods as are suited for the customization of streamed sports events and other live and pre-recorded content.

SUMMARY OF THE INVENTION

The foregoing are among the objects attained by the invention, which provides in some aspects methods of customized streamed digital content generation. The methods can be used in connection with distribution of digital content, e.g., by content distribution networks or content insertion servers.

Thus, methods of digital content generation according to an aspect of the invention include the steps of receiving a request for a second digital content piece to supplement a first digital content piece being streamed to a user digital data device; determining a source of the first digital content piece and a locale of the user digital data device; inferring a type of the first digital content piece from the source of the first digital content piece and from a time for delivery of the first digital content piece to the user digital data device; selecting a digital content piece from among a plurality of digital content pieces, each of which is associated with one or more locales; and, transmitting, as the second digital content piece, the selected digital content piece or a reference thereto for delivery to the user digital data device in connection with the first digital content piece.

Further aspects of the invention provide methods of digital content generation, e.g., as described above, in which the request for the second digital content piece is received from any of a content distribution network, a content insertion server or a user digital data device.

Still further aspects of the invention provide methods of digital content generation, e.g., as described above, in which the step of selecting from among the plurality of digital content pieces is based on at least the locale of the user digital data device and the time for delivery of the first digital content piece to the user digital data device.

In related aspects, the invention provides methods, e.g., of the type described above, in which the step of selecting from among the plurality of digital content pieces additionally includes making that selection based on the source of the first digital content piece and/or the time of delivery of the first digital content piece to the user digital data device.

In related aspects, the invention provides methods, e.g., as described above, in which the plurality of digital content pieces from which the aforesaid selection is made are segmented (or pooled) based on content type and locale.

Yet still further aspects of the invention provide methods of digital content generation, e.g., as described above, wherein the type of the first digital content piece is inferred without user-specific information other than a source from which the first digital content piece was requested, a time of the request and a locale of the user digital data device.

Yet still further aspects of the invention provide methods of digital content generation, e.g., as described above, including selecting multiple digital content pieces from among a plurality of digital content pieces and stitching together those multiple selected digital content pieces for transmission as the second digital content piece.

Other aspects of the invention provide a system for customized digital content delivery having a first content server, a second content server, a content distribution server that is coupled for communication with each of the first content server and the second content server, and a user digital data device that is coupled for communication with the content distribution server. In such a system, the content distribution server streams to the user digital data device a first digital content piece generated by the first content server, and the second content server operates in accord with a method for content generation, e.g., as described above.

Thus, for example, according to some aspects of the invention, the second content server receives a request for a second digital content piece to supplement the first digital content piece being streamed to the user digital data device, identifies the first content server as a source of the first digital content piece and determines a locale of the user digital data device, infers a type of the first digital content piece from the source of the first digital content piece and a time for delivery of the first digital content piece to the user digital data device, selects a digital content piece from among a plurality of digital content pieces, each of which is associated with one or more locales, and transmits the selected digital content piece or a reference thereto as the second digital content piece for delivery to the user digital data device in connection with the first digital content piece.

Further related aspects of the invention provide a system, e.g., as described above, wherein the first content server and the content distribution server are one in the same and/or co-housed with one another. Conversely, in other related aspects of the invention, the second content server and the content distribution server are one in the same and/or co-housed with one another.

The foregoing and other aspects of the invention are evident in the discussion that follows and in the drawings.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Architecture

Figure 1:
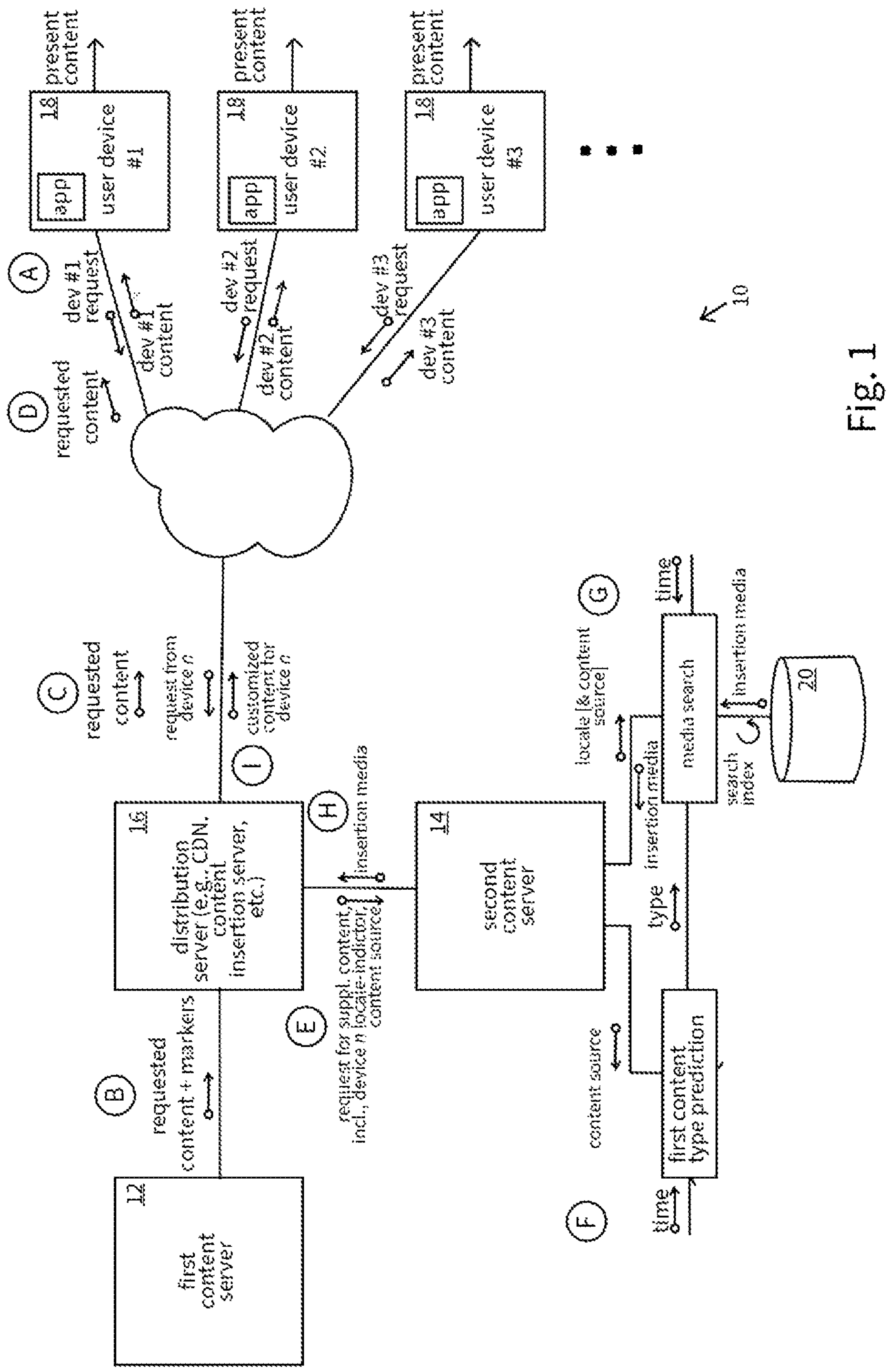
FIG. 1 depicts a system and method for content generation and delivery according to the invention.

FIG. 1 depicts a system 10 for customized digital content delivery according to a practice of the invention. The system 10 includes a first content server 12, a second content server 14, and a content distribution server 16 that is coupled for communication with each of the first content server 12 and the second content server 14. At least one and, typically, many (e.g., tens, hundreds, thousands or more) user digital data devices are coupled for communication with the content distribution server 16. Three such user digital data devices 18 are shown in the drawing, labelled, "user device #1," "user device #2," and "user device #3," respectively. Likewise, though only a single first content server 12 and distribution server 16 are shown in the drawing, in practice, a second content server 14 as described below may me arranged to work with multiples of those devices.

Illustrated first content server 12 is a video server of the type known in the art suitable for delivering video directly or indirectly (e.g., via a content distribution network) to user digital data devices 18. Although a network-class video server in the illustrated embodiment, in other embodiments the server 12 may comprise any other digital data device of the type known in the art (e.g., workstation, desktop computer, portable computer, or so forth) suitable for so delivering such video. Regardless, such video server or other digital data device is adapted in accord with the teachings hereof for operation in the role of the first content server 12.

Illustrated second content server 14 generates supplemental digital content pieces, typically, videos, in response to requests received from the distribution server 16 and/or user digital data devices 18, as discussed more fully elsewhere herein. The server 14 may comprises a video server or other digital data device of the type known In the art as adapted in accord with the teachings hereof.

As used with respect to the illustrated embodiment, "digital content piece" refers to streamed video, audio or other digital content (including, by way of non-limiting example, live sports or other entertainment events, pre-recorded such events, and so forth) and time-wise segments such streamed content (e.g., a one-minute video segment within an hour-long streamed video program, or so forth). In some embodiments, one or more segments of a digital content piece can be downloadable, e.g., for time-limited consumption or otherwise.

Distribution server 16 streams digital content pieces generated by first and second content servers 12, 14 to user digital data devices 18. Where those content pieces come from alternate ones of those servers, the server 16 can also stitch them together for continuous streaming. The server 16 may comprise a content delivery network, an ad or other content insertion server, or other suitable digital data device, all of the type known in the art as adapted in accord with the teachings hereof. The distribution server 16 may be coupled for communications with each of the first and second content servers 12, 14 via the Internet or other network, combination thereof, or other communications medium per convention in the art as adapted in accord with the teachings hereof. Though not illustrated here, in some embodiments, the distribution server 16 is integral to either of the first or second content servers 12, 14 or otherwise co-housed therewith.

User digital data devices 18 support the consumption of digital content pieces, e.g., videos, by their respective users (not shown). These may be dedicated devices (such as, for example, set-top boxes), general purpose devices (such as, for example, mobile phones, laptop computers, desktop computers, running browsers, apps or otherwise to facilitate such consumption) or other digital data devices of the type known in that art, as adapted in accord with the teachings hereof), suitable for requesting such content from servers 12, 14 and/or 16 and presenting it to their respective users, all per convention in the art as adapted in accord with the teachings hereof. The user digital data devices 18 may be coupled for communications with the distribution server 16 via the Internet or other network, combination thereof, or other communications medium per convention in the art as adapted in accord with the teachings hereof.

Operation

In operation, a user digital data device 18 (e.g., user device #1) issues a request for streamed content (a/k/a, a digital content piece) from first content server 12. See FIG. 1, Step A. The discussion below focuses on response of the system 10 to that request, which is referred to as a request for a "first" or "requested" digital content (piece), and particularly on customization of the content streamed to that user digital data device device in response to that request based, e.g., on the locale of the user digital data device, the source of the requested content and time.

It will be appreciated that the teachings below are equally applicable to the customization of streams of content by system 10 to the other user digital data devices (e.g., user device #2, user device #3) in response to requests independently issued by them at the same or different times for the same or different content, though, in those instances, such customization is based on the respective locales of those other user digital data devices, the respective sources of the content requested by them and the respective times.

Returning to the discussion above, the request of Step A is issued per convention in the art, e.g., using adaptive HTTP-based protocols or otherwise. The request is fielded by the first content server 12, which initiates streaming the requested content piece via the distribution server 16, again, per convention in the art as adapted in accord with the teachings hereof. Step B. Markers within (or otherwise associated with) the requested content piece identify time-wise segments (or intervals) that are opportunities for insertion of custom or other content into the stream per convention in the art as adapted in accord with the teachings hereof. Those skilled in the art will appreciate that the format and mode of communication of those markers (e.g., whether inline, out-of-band, or otherwise) is dependent on the streaming protocol and is otherwise within the ken of those skilled in the art in view of the teachings hereof.

The distribution server 16 directs the streamed, requested content piece to the requesting user digital data device 18 for presentation thereby to its respective user, all per convention in the art as adapted in accord with the teachings hereof. Steps C and D. In some embodiments, the server 16 caches all or a portion of the streamed content piece for use in responding to future requests for the same piece by other user digital data devices 18.

When the distribution server 16 encounters a marker, marker-pair or other indicator of an insertion opportunity in the content piece being streamed to the user digital data device 18, it generates a request to the second content server 14 for a supplemental piece of digital content. Step E. In the illustrated embodiment, the request by the distribution server 16 in step E is generated in just-in-time fashion—e.g., typically, hundreds of milliseconds or less before the supplemental content piece is to be stitched into the stream of the requested content piece being sent from the distribution server 16 to the user digital data device 18.

The supplemental content request issued in Step E includes an indicator of the locale of the requesting user digital data device 18. This can be an actual location name (e.g., city/state), an IP address or some other designator from which the location of the device 18 can be estimated at least at the regional or state level of granularity and, preferably, at least at the city level of granularity. The supplemental content request can also include the identity of the source of the content piece being streamed to the user digital data device 18. In some embodiments, the latter can be the identity of the first content server 12, though, it can also be the identity of the broadcaster, digital channel and/or website/portal from which the first content piece emanates. The supplemental content request can also include a time associated with that content piece, e.g., a time the piece is scheduled to be streamed to the user digital data device (which, in view of the just-in-time nature of the illustrated system 10, equates with the time the request of step E is generated by the distribution server 16 and received by the second content source 14). Transmission of such a supplemental content request, whether in accord with the aforesaid protocol or otherwise, is within the ken of those skilled in the art in view of the teachings hereof.

Systems according to the invention customize streams to the user digital data device by inferring the type (if not the specific identity) of content requested by the user digital data device 18 without user-specific information other than a locale of that device 18, a source from which the first digital content piece was requested, and a time of the request. This is advantageous in that it permits generation of a customized second digital content piece by the second content server 14, without running afoul data privacy laws that increasingly restrict the ability of content sources (e.g., first content server 12) or distributors (e.g., distribution server 16) to share data regarding the user of digital data device 18.

Upon receipt of the supplemental content request, the second content server 14 infers at least the type (which can be the identity) of the requested content piece—i.e., the piece that is being streamed to the user digital data device 18 from the first content server 12. Step F.

In the illustrated embodiment, this is done through use of a look-up table that correlates content sources (as received with the supplemental content request) and times (as received with the supplemental content request or otherwise acquired by the second content server 14) with content types and/or, optionally, names of specific content pieces. By way of illustrative example, the second content server 14 can infer, in step F, that a first content piece streamed to a user digital device 18 in Massachusetts at 7 pm on a Monday night from the broadcaster NBC is a live baseball game or, for example, more particularly, a game between the Giants and the Braves. In some embodiments, the user digital data device locale indicator (as received with the supplemental content request) is also necessary for such look-up. The generation of such a look-up table, e.g., using information published by broadcasters and other content sources, is within the ken of those skilled in the art in view of the teachings hereof—though, it will be appreciated that other techniques (e.g., probing a feed from the first content source 12) for determining the type (if not also the identity) of the requested content piece from information supplied in the supplemental content request is also with the ken of those skilled in the art.

In step G, the second content server 14 selectively identifies from among a plurality of digital content pieces contained in an onboard or remote storage device 20—each of which pieces is associated with one or more locales and, optionally, one or more classes of content—a supplemental video content piece that can be used by server 16 to customize the stream delivered to the requesting user digital data device 18. In the illustrated embodiment, this can be done through use of a look-up table that correlates the type (if not identity) of the requested digital content piece (as determined in Step F), the estimated locale of the user digital data device 18 (as received with the supplemental content request) and, in some embodiments, (i) the identification of the source of the first digital content piece (as received with the supplemental content request) with an identifier of a supplemental content piece to be returned, if at all, to the distribution server 16 for stitching into the stream to the user digital digital data device 18, and/or (ii) other parameters to be used by the second content server in identifying such supplemental content for return to the distribution server.

Such a look-up table, the generation of which is within the ken of those skilled in the art in view of the teachings hereof, can specify for example that, for a certain type of requested digital content piece being streamed to a user digital data device 18 in a certain locale, a specific supplemental content piece for that locale (or a piece selected from a specific class of supplemental content pieces for that locale) should be returned to the distribution server 16 for inclusion in that stream.

To continue the above example, such a look-up table can specify that, in response to a supplemental content request received at 7 pm in connection with streaming a live baseball game from NBC to a user digital data device 18 in Massachusetts, a premium video advertisement (or a URL or other reference thereto) for a New England auto dealer (or an advertisement selected at random or otherwise from a premium class of advertisements for that same or another New England merchant) should be returned to the distribution server 16 for insertion in that stream.

On the other hand, that same look-up table can specify that no such supplemental video should be returned to the distribution server 16 when such a supplemental content request is received at 7 pm in connection with streaming that same type of content (i.e., live baseball or other sports game) from NBC to a user digital data device 18 in Atlanta (e.g., where the live game between the Giants and Braves is being played at the time of the request). Alternatively, in such an instance, the look-up table could specify return of a sub-premium video advertisement (or URL or other reference thereto) or an advertisement selected at random or otherwise from a sub-premium class of advertisements is to be returned to the distribution server 16 for insertion in that stream.

Once a supplemental digital content piece has been identified, the second content server can retrieve it (or its URL or other reference thereto), via an index search or otherwise, from the store 20, which can be segmented (or pooled) based on content type, supplemental content class (e.g., premium, sub-premium and so forth) and/or locale, all by way of non limiting example. In some embodiments, the second content server pre-fetches supplemental content pieces for which URLs or other references have been retrieved—so that content can be returned to the distribution server in step H in lieu of the URLs or other references. This can be particularly advantageous for sub-premium-class or other content for which those URLs or other references point to remote and/or third-party servers. In the event those URLs or other references are broken (e.g., are invalid, refer to improper content or otherwise), the second content server repeats step G to find an alternate piece of supplemental content.

If the supplemental digital content piece identified by the second content server 14 in step G is not of sufficient duration to occupy a time interval, if any, specified by the distribution server 16 in the supplemental content request (or, conversely, a default such interval), the second content server 14 can repeat step G in order to identify additional supplemental digital content pieces which are stitched together by server 14 to occupy that time interval, all as is within the ken of those skilled in the art in view of the teachings above.

Of course, the examples above are illustrative only and non-limiting. Thus, for example, in some embodiments, the second content server 14 delivers video other than advertisements in response to requests received from the distribution server 16. In still other embodiments, the specific advertisement (or other supplemental video content) or class from which such advertisement (or other supplemental video content) is selected is segmented other than via premium and sub-premium classifications, all as is within the ken of those skilled in the art in view of the teachings hereof.

In step H, the second content server 14 returns to the distribution server 16 the supplemental content piece identified in step G, if any. And, in step I, the distribution server 16 stitches the supplemental digital content piece, if any, returned (or identified by URL or otherwise) by the second content server 14 in step G into the stream being delivered to the requesting user digital data device 18 for presentation to the user thereof. If no such supplemental content piece (or identifier) is returned in step H, the distribution server 16 can make requests to other content sources (not shown) for insertion content or can utilize default content (whether supplied by the first content server 12 or otherwise) for such purpose.

Alternative Architectures

Discussed above is an architecture and method for customized digital content delivery utilizing a server-side content insertion model. In alternative embodiments, a client-side content insertion model can be used instead or in addition. Those alternative embodiments may or may not include a distribution server 16 and, in case they do not, the requested content piece is streamed directly from the first content server 12 to the requesting user digital data device 18. Moreover, in those embodiments, the requests of step G and responses of step H are made by and to the user digital data device 18 directly, all as is within the ken of those skilled in the art in view of the teachings hereof.

Additional information regarding practice of the invention is provided FIGS. 2-6.

Figure 2:
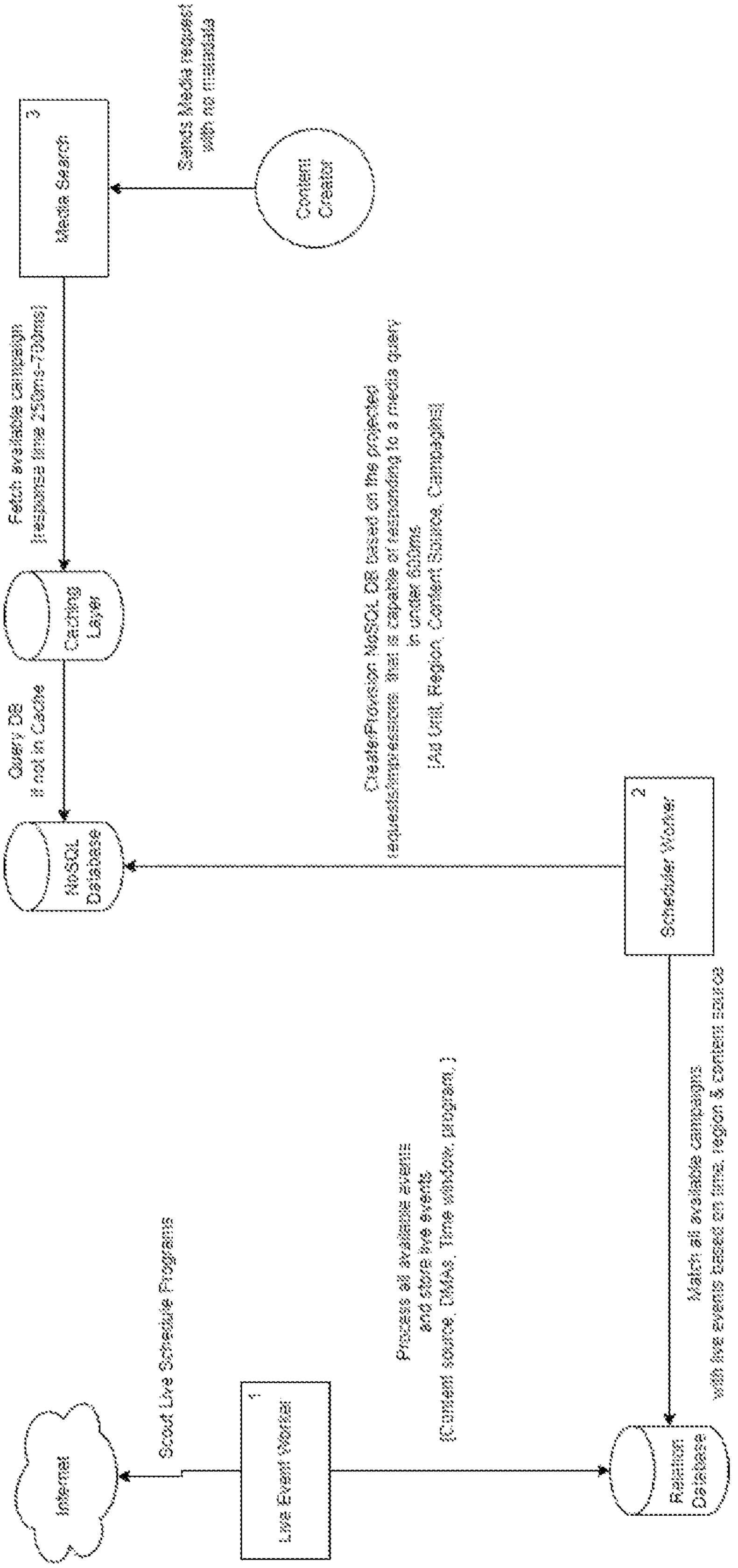
FIG. 2 is an overview flowchart of a process according to the invention.

FIG. 2 is an overview flowchart of a process according to the invention. It enables rapid, accurate, and economically viable delivery of content in ambiguous environments where details of origin are unknown. It's features include:

- Allows the system to identify the content source without any additional work/information from the content provider
- System segments data into smaller chunks of indexed data to optimize response time [under 600 ms]
- The data segmentation and inventory forecast allows the platform to automatically scale its internal services to optimize the response time.
- Each data segment ensures that campaigns are delivered only within the scheduled inventory during a live program, increasing product value
- Reduce waste of impressions and Increase the profitability of the content provider.

Figure 3:
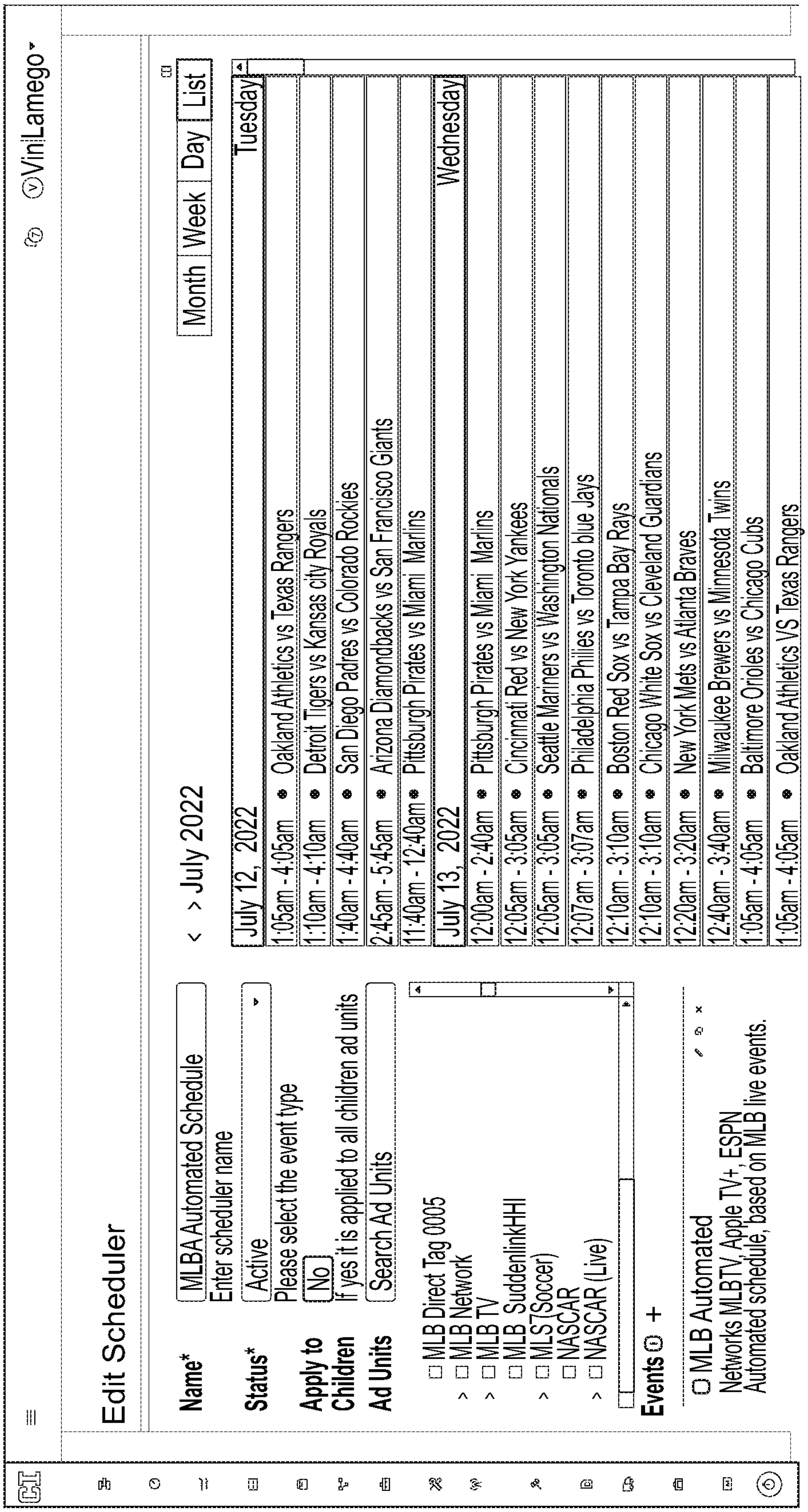
FIGS. 3 and 4 depict first and second screens, respectively, of a user interface of a scheduler in a system according to the invention.
Figure 4:
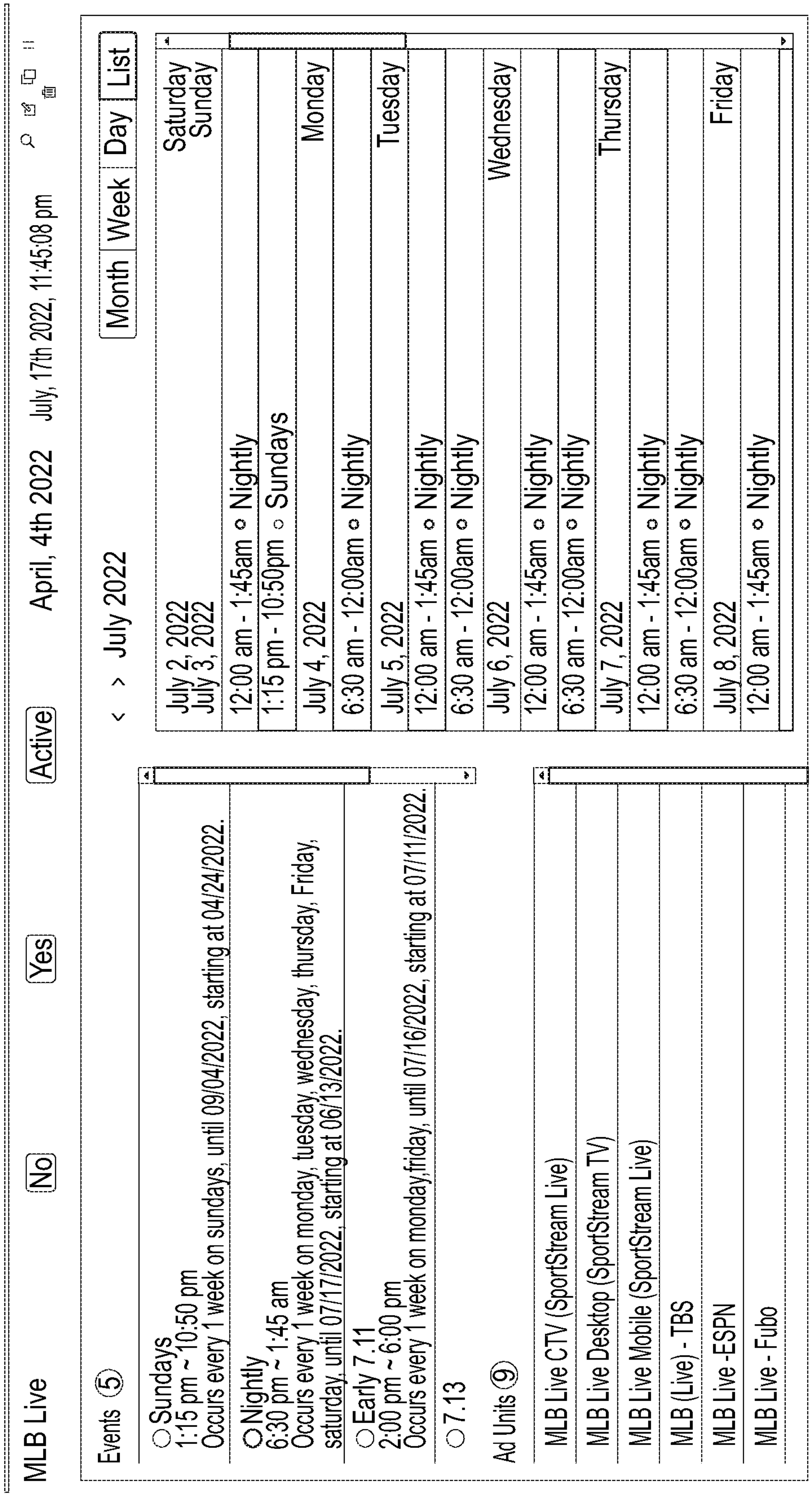

FIGS. 3 and 4 depict first and second screens, respectively, of a user interface of a scheduler in a system according to the invention.

Figure 5:
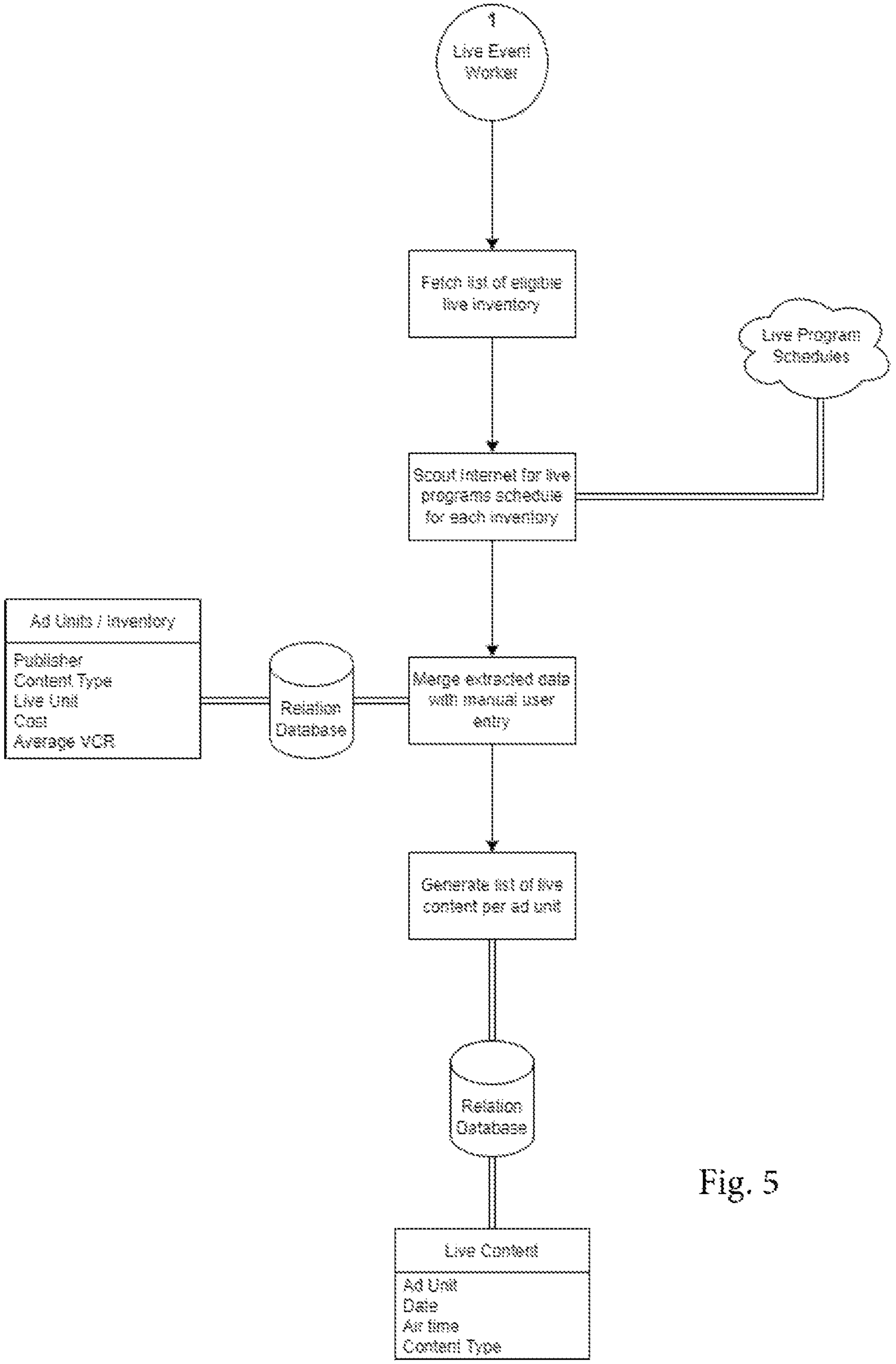
FIG. 5 is a flow chart of steps executed by live event worker functionality in a process according to the invention.

FIG. 5 is a flow chart of steps executed by live event worker functionality in a process according to the invention.

Figure 6:
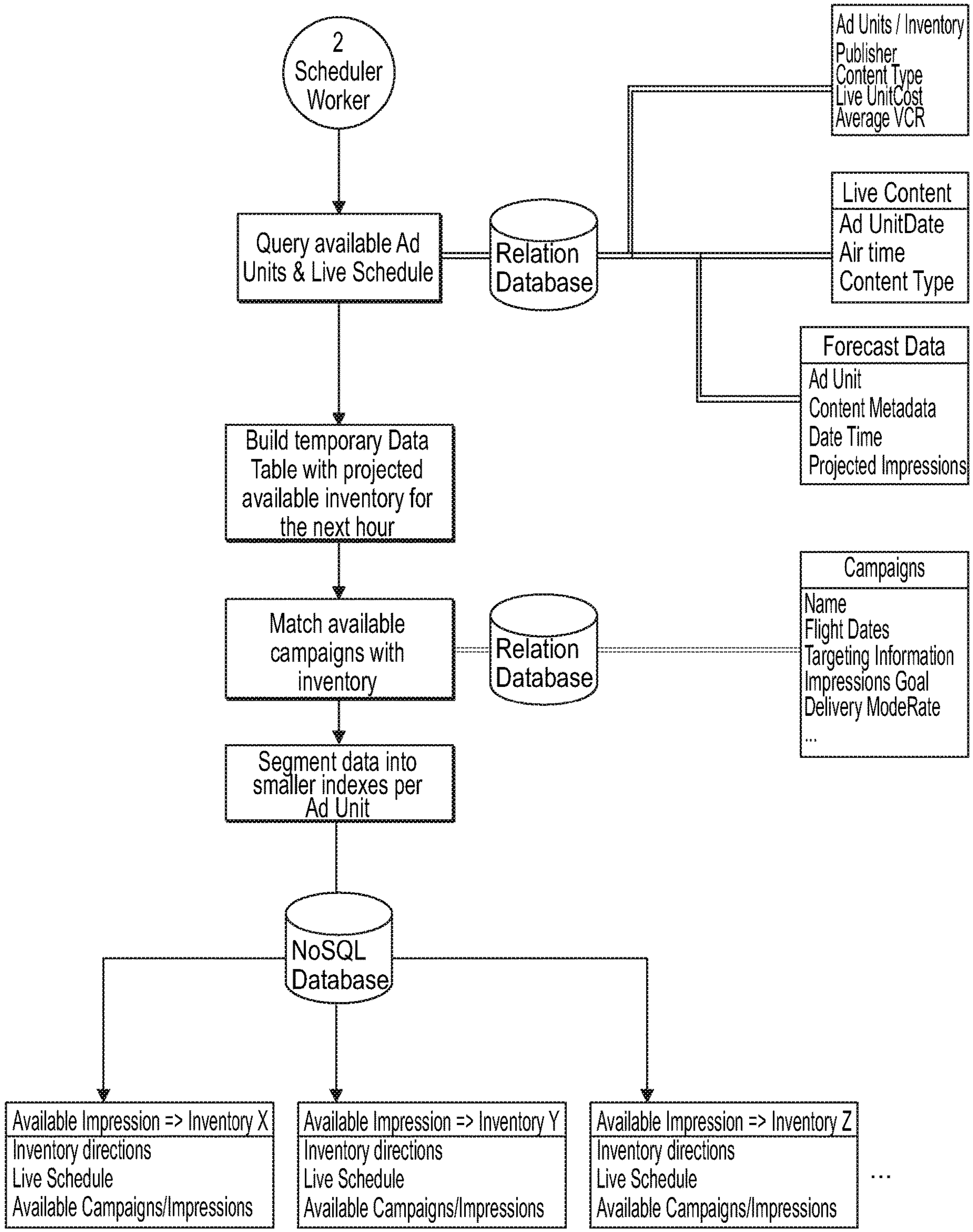
FIG. 6 is a flow chart of steps executed by scheduler worker functionality in a process according to the invention.

FIG. 6 is a flow chart of steps executed by scheduler worker functionality in a process according to the invention.

Described herein are systems and methods meeting the objects set forth above.

It will be appreciated that the embodiments shown in the drawing and described above are merely examples of the invention, and that other embodiments incorporating changes thereto also fall within the scope of the invention, of which we claim:

1. A method of customized digital content generation, comprising

A. with a distribution server that is coupled for communications with a first content server and with a second content server and that is coupled by way of a network to a plurality of user digital data devices that generate requests for digital content pieces, (i) directing streaming of a first digital content piece from the first content server to a requesting one of the user digital data devices, and (ii) in response to a marker or trigger encountered in the first digital content piece while it is being streamed to the requesting user digital data device, directing a request to the second content server for a second digital content piece to supplement the first digital content piece being streamed to the requesting user digital data device, B. determining a source of the first digital content piece and a locale of the requesting user digital data device, C. inferring a type of the first digital content piece from the source of the first digital content piece and from a time for delivery of the first digital content piece to the requesting user digital data device, D. selecting, as the second digital content piece, a digital content piece from among a plurality of digital content pieces, each of which is associated with one or more locales, wherein step (D) includes selecting from among the plurality of digital content pieces based on at least one of the locale of the requesting user digital data device and the type inferred in step (C), and E. with the distribution server, customizing streaming of the first digital content piece to the requesting user digital data device by inserting into such stream for delivery to that user digital data device a stitching together of the first digital content piece and the second digital content piece.

2. The method of claim 1, wherein the request for the second digital content piece is generated by any of a content distribution network, a content insertion server or the requesting user digital data device.

3. The method of claim 1, wherein step (D) includes selecting from among the plurality of digital content pieces based on the source of the first digital content piece.

4. The method of claim 1, wherein step (D) includes selecting from among the plurality of digital content pieces based on the time of delivery of the first digital content piece to the requesting user digital data device.

5. The method of claim 1, wherein the plurality of digital content pieces from which the selection is made in step (D) are segmented based on any of content type, classification and locale.

6. The method of claim 1, wherein step (C) includes inferring the type of the first digital content piece without user-specific information other than a source from which the first digital content piece was requested, a time of the request, and a locale of the requesting user digital data device.

7. The method of claim 1, wherein step (D) includes selecting multiple digital content pieces from among the plurality of digital content pieces, and step (E) includes stitching together those multiple selected digital content pieces as the second digital content piece.

8. The method of claim 1, including any of the steps of (i) segmenting, based on any of content type, classification and locale, the plurality of digital content pieces from among which the second digital content pieces is selected, (ii) forecasting an inventory of the plurality of digital content pieces from among which the second digital content piece is selected, (iii) pre-fetching a second digital content piece that is represented by a URL or other reference.

9. A system for customized digital content delivery, comprising

A. a first content server,

B. a second content server,

C. a content distribution server that is coupled for communication with each of the first content server and the second content server, D. a user digital data device that is coupled for communication with the content distribution server via a network, E. the content distribution server streaming to the user digital data device a first digital content piece generated by the first content server and, in response to a marker or trigger encountered in the first content piece while it is being streamed to the user digital data device, generating a request for a second digital content piece to supplement the first digital content piece, F. the second content server i. receives the request for a second digital content piece to supplement the first digital content piece, ii. identifies the first content server as a source of the first digital content piece and determines a locale of the user digital data device, iii. infers a type of the first digital content piece from the source of the first digital content piece and a time for delivery of the first digital content piece to the user digital data device, and iv. selects a digital content piece from among a plurality of digital content pieces, each of which is associated with one or more locales, wherein such selection is based on at least one of the locale of the requesting user digital data device and the inferred type of the first digital content piece, and v. transmits, as the second digital content piece, the selected digital content piece or a reference thereto for delivery to the user digital data device in connection with the first digital content piece, and G. the content distribution server customizes streaming of the first digital content piece to the requesting user digital data device by inserting into such stream for delivery to that device a stitching together of the first digital content piece and the second digital content piece.

10. The system of claim 9, wherein the content distribution server is co-housed with either of the first and second content servers.

11. The system of claim 9, wherein the second content server receives the request from the content distribution server.

12. The system of claim 9, wherein the second content server receives the request from the user digital data device.

13. The system of claim 9, wherein the second digital content server (i) segments, based on any of content type, classification and locale, the plurality of digital content pieces from among which the second digital content pieces is selected, (ii) forecasts an inventory of digital content pieces from among which the second digital content piece is selected, (iii) pre-fetches a second digital content piece that is represented by a URL or other reference.

* * * * *